United States Patent [19]

Fast

[11] Patent Number: 4,660,599
[45] Date of Patent: Apr. 28, 1987

[54] RELIEF DEVICE FOR A VACUUM VESSEL

[75] Inventor: Ronald W. Fast, Batavia, Ill.

[73] Assignee: The United States of America as represented by the United States Department of Energy, Washington, D.C.

[21] Appl. No.: 830,811

[22] Filed: Feb. 19, 1986

[51] Int. Cl.$^4$ .............................................. F16K 15/03
[52] U.S. Cl. .................. 137/512.2; 137/512; 137/527.6; 137/527.8
[58] Field of Search ...................... 137/512, 512.2, 527, 137/527.6, 527.8

[56] References Cited

U.S. PATENT DOCUMENTS

| | | | |
|---|---|---|---|
| 157,791 | 12/1874 | Cameron | 137/512.2 |
| 2,082,543 | 6/1937 | Hillman | 137/512.2 X |
| 4,281,680 | 8/1981 | Ripert | 137/527.8 X |
| 4,471,812 | 9/1984 | Bertsch | 137/527.6 X |

FOREIGN PATENT DOCUMENTS 411408  6/1910  France .............................. 137/512.2

Primary Examiner—Alan Cohan
Assistant Examiner—John A. Rivell
Attorney, Agent, or Firm—Gustavo Siller, Jr.; Paul A. Gottlieb; Judson R. Hightower

[57] ABSTRACT

A pressure relief device 5 for a vessel having redundant pressure relief capabilities. An annular plate 12 overlies a surface 11 which has an aperature to the vessel. A seal is formed between the surface 11 and annular plate 12. A solid plate 13 overlies the annular plate 12. A seal is formed between the solid plate 13 and annular plate 12. The relief device 5 will open at a first predetermined pressure by lifting the solid plate 13. In the event the seal between solid plate 13 and annular plate 12 should stick the relief device 5 will open at a second slightly higher, predetermined pressure by lifting the annular plate 12 and solid plate 13 together. Hinging means 6 are provided to reclose the pressure relief device 5 when conditions return to normal.

18 Claims, 2 Drawing Figures

RELIEF DEVICE FOR A VACUUM VESSEL

CONTRACTUAL ORIGIN OF THE INVENTION

The United States Government has rights to this invention pursuant to Contract No. DE-AC02-76CH03000 between the U.S. Department of Energy and Universities Research Association, Inc.

BACKGROUND OF THE INVENTION

The present invention relates generally to a pressure relief device for a vessel and more particularly to a resealing pressure device valve for the vacuum vessel of a superconducting magnet, having redundant pressure relief capabilities.

The Collider Detector, Fermilab (CDF) utilizes a superconducting solenoid to produce a horizontal magnetic field used to study particle collisions in the Tevatron. The vacuum vessel which houses the superconducting coils consists of two concentric cylinders. The walls of these concentric cylinders are made as thin as design requirements will permit.

Under normal design conditions, the vacuum vessel is a dewar, that is the space between the two cylinders is a vacuum. Thus, the working pressures that the cylinder walls are designed for, assume a vacuum between the two cylindrical shells.

The maximum allowable working pressure (MAWP) for a cylindrical shell where the pressure is compressing the shell radially inward is much lower than the MAWP, for a cylindrical shell of similar dimensions, where the pressure is pushing the cylindrical shell radially outward.

Since the CDF vacuum vessel is constructed of two concentric cylindrical shells instead of a solid cylindrical tank, it is more sensitive to pressure excursions than most vacuum vessels. As stated above the vacuum vessel walls are designed as thin as possible, under the assumption that the space between the two shells will be a vacuum. Therefore, the inner shell wall is designed assuming that the vacuum will pull the wall radially outward. A loss of vacuum to the vessel, however, may result in a higher pressure in the vessel than the ambient pressure. This higher pressure would compress the inner cylindrical shell radially inward. A pressure difference of as little as 3 psig would result in a failure of the inner shell.

Replacement of the vacuum vessel and any equipment damaged due to such failure would pose a great expense. Thus, the CDF vacuum vessel must have a reliable pressure relief system to protect it from pressure excursions. The pressure relief system must assure that the vacuum vessel will be relieved at about 1 psig (16 psia).

Spring activated pressure relief valves and nonreclosing weight type pressure relief devices are available commercially. A nonreclosing weight type pressure relief device has been built and used at Fermi. The device includes a single solid plate overlying a flange. The topside of the flange has circular grooves in which o-rings are placed to form a seal between the plate and the flange. Similar commercially available relief devices provide means for reclosing the top plate after conditions have returned to normal. These relief devices however do not provide any redundant pressure relief capabilities. If the seal between the plate and the flange were to stick, the vessel would not be relieved at the desired pressure.

Given the low tolerance of the system, a mechanical failure of the relief device would lead to the collapse of the inner cylindrical shell of the vacuum vessel. A pressure relief device need only stick for a few psi over the valve design pressure, to cause a failure of the vacuum vessel. Therefore, a single commercially available relief device would not provide a reliable pressure relief system, since a single commercially available relief device does not provide any redundant capabilities, in the event of device failure.

Additional reliability could be added to the system, using available pressure relief devices, by adding a second safety relief device in the vacuum vessel. This would assure that the vacuum vessel would be relieved at the desired pressure, even if one of the safety relief devices were to stick. Space limitation on the vacuum vessel however, make a dual relief valve system undesirable. Most of the vacuum vessel is surrounded by other components of the detector, limiting the amount of space available. Further, the instrumentation for the CDF requires as much available space as possible. Thus, although an additional relief device would provide redundant safety relief reliability, space limitations would make the system undesirable.

Another pressure relief device available commercially is the rupture disc. The rupture disc comprises a sheet of metal that will break at a given pressure. These devices, however, are not available for the pressures needed in the CDF vacuum vessel. Additionally, these devices have variable tolerance of 10–15 psi. These variable tolerances are well above the failure point of the vacuum vessel making the rupture disc an unacceptable alternate.

Therefore, in view of the above, it is an object of the present invention to provide a pressure relief device which will open at a predetermined pressure.

It is another object of the present invention to provide a pressure relief device with redundant pressure relief capabilities which will open at first predetermined pressure and also at a second, slightly higher, predetermined pressure.

It is another object of the present invention to provide a pressure relief device with redundant pressure relief capabilities which will not require more space than a single pressure relief valve.

It is still another object of the present invention to provide a pressure relief device which will operate in a narrow range of tolerances.

It is still another object of the present invention to provide a pressure relief device with redundant pressure relief capabilities which will reclose after normal conditions have been restored, that is a relief valve.

Additional objects, advantages and novel features of the invention will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects in accordance with the purposes of the present invention, as embodied and broadly described herein, the pressure relief device of this invention may comprise a pipe with a flange attached to one end and mounted to the vacuum vessel at the other end. The topside of the flange may have grooves where o-rings are placed. An annular plate is superposed on the flange such that a seal is formed between the flange and the annular plate. A solid plate overlies the annular plate such that a seal is formed between the solid plate and the annular plate. A hinge mechanism is provided such that the annular plate and the solid plate are both hinged to the flange. The size and weight of the solid plate and the annular plate are predetermined such that the valve will open at a first predetermined pressure by lifting the solid plate and at a second, slightly higher, predetermined pressure by lifting both the solid plate and the annular plate.

DETAILED DESCRIPTION OF THE INVENTION

Figure 1:
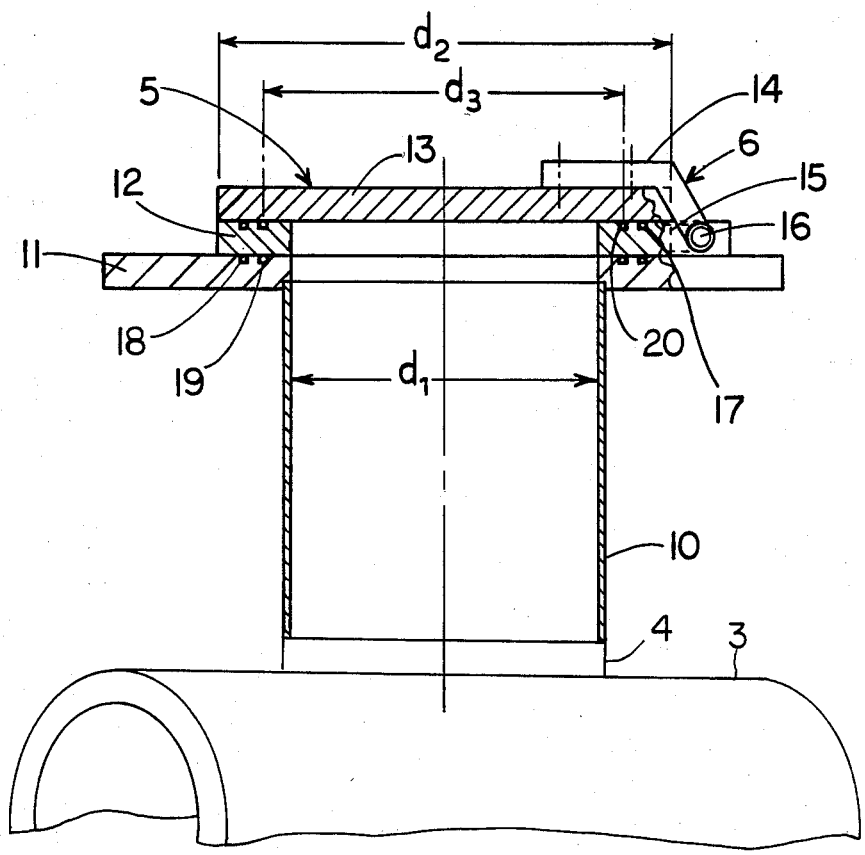
FIG. 1 is a cross-sectional view of the pressure relief valve of the present invention.
Figure 2:
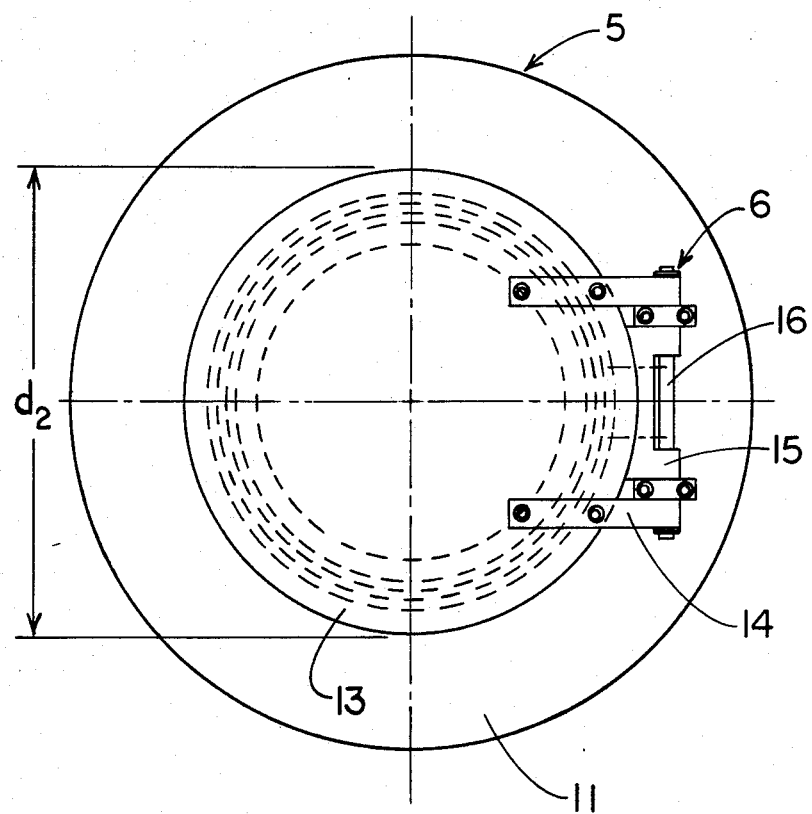
FIG. 2 is a top view of the pressure relief valve of the present invention.

Reference will now be made to the present preferred embodiment of the invention, an example of which is illustrated in the accompanying drawings. Referring to FIGS. 1 and 2, the pressure relief valve 5 consists of a pipe segment 10 of inner diameter $d_1$, which is connected by connecting means 4 to the vacuum vessel 3 (shown partially) at one end. A flange 11 is attached to the other end of the pipe segment 10. The topside of flange 11 has grooves 18 in which o-rings 19 are placed. Annular plate 12 has a smooth underside and a topside with grooves 20. O-rings 17 are positioned in grooves 20. The annular plate 12 is super posed on flange 11 such that the smooth side faces the flange 11. The o-rings 19 in the groove 18 of flange 11 form a seal between the annular plate 12 and the flange 11.

A solid plate 13 overlies the annular plate 12. 0-rings 17 are placed in grooves 20 to form a seal between the annular plate 12 and solid plate 13.

The solid plate 13 and the annular plate 12 are of predetermined size and weight, such that the valve will open at a first predetermined pressure by lifting the solid plate 13 and at a second predetermined pressure by lifting the solid plate 13 and the annular plate 12 together. The weight $W_1$ of the solid plate 13 and weight $W_2$ of the annular plate 12 necessary to open the valve with a single o-ring at pressures $P_1$ and $P_2$ respectively can be calculated from equations 1 and 2.

$$W_1 = P_1 \times \text{area inside o-ring} \quad (1)$$
$$= (P_1) \pi (d_3/2)^2$$

$$(2) \quad W_1 + W_2 = (P_2)\pi(d_3/2)^2$$

Under normal conditions the valve will open by breaking the seal between the solid plate 13 and annular plate 12 thereby lifting the solid plate 13 of weight $W_1$. However, in the event the o-ring 17 should stick, the valve will open at pressure $P_2$ by breaking the seal between annular plate 12 and flange 11 and thereby lifting the solid plate 13 and annular plate 12 together, of weight $W_1 + W_2$.

Thus, the valve of the present invention has an inherent safety feature which will relieve the vacuum vessel at a first predetermined pressure and will also relieve the vessel at a slightly higher second predetermined pressure, in the event of a mechanical malfunction in the valve at the first predetermined pressure.

In the preferred embodiment of the present invention, a second o-ring groove and o-ring will be placed on both the flange and the annular plate adjacent to the first o-ring. This will insure a proper seal in the valve. The addition of the second o-ring will create a vacuum between the two o-rings. The pressure necessary to open the valve with two o-rings will be increased by the pressure necessary to overcome the vacuum between the o-rings.

Although the invention has been described using o-rings as a seal between the sold plate and the annular plate and between the annular plate and the flange, it will be readily apperent to those skilled in the art that other means may be used as seals between the parts.

In the preferred embodiment of the present invention, as illustrated in FIGS. 1, and 2, both the solid plate 13 and annular plate 12 are hinged to flange 11 by hinge 6. Hinge pin 16 is mounted to flange 11. Arms 14 attach solid plate 13 to the hinge pin 16. An arm 15 attaches annular plate 12 to the hinge pin 16. Thus, both annular plate 12 and solid plate 13 are hinged to flange 11 by a single pin. The hinge arrangement will assure that the solid plate 13 and annular plate 12 are not blown off when the valve opens. Additionaly, it will assure that the solid plate and annular plate of the valve will realign when the valve closes.

Having generally described the invention, the following specific example is given as further illustration thereof. A pressure relief valve was designed and built for use in the CDF vacuum vessel. The valve consisted of a stainless steel flange with inner diameter, $d_1 = 8\frac{1}{4}''$ welded to an 8" pipe. The flange has two o-ring grooves. An aluminum annular plate with inner diameter, $d_1 = 8\frac{1}{4}''$ and outer diameter, $d_2 = 12''$, with two o-ring grooves on the topside was hinged from the flange. The annular plate had a $\frac{5}{8}''$ thickness and weighed 3.50 pounds. An aluminum solid top plate with $D_2 = 12''$ was also hinged from the flange. The top plate had a $\frac{5}{8}''$ thickness and a weight of 7.25 pounds. The inner o-ring groove's inner diameter, $d_3$ was 9.620 inches giving an area inside the o-ring of 72.68 in.$^2$.

In order to lift the top plate, we need $7.25/72.68 = 0.1$ psia. If both the top plate and the ring are lifted together we need $10.75/72.68 = 0.15$ psia.

The pressure necessary to open the valve with vacuum between the o-rings was determined empirically. The results are tabulated in Table I.

TABLE I

| | Cracking Pressure with Vacuum Between O-Rings | | |
|---|---|---|---|
| | Atm (psi) | Opened (psi) | P (psi) |
| 0 days | 14.49 | 15.33 | 0.84 |
| | 14.49 | 15.34 | 0.85 |
| | 14.49 | 15.34 | 0.85 |
| | 14.49 | 15.35 | 0.86 |
| | 14.49 | 15.34 | 0.85 |
| | 14.49 | 15.35 | 0.86 |
| 1 day | 14.66 | 15.63 | 0.97 |
| | 14.66 | 15.52 | 0.86 |
| | 14.66 | 15.55 | 0.89 |
| | 14.66 | 15.55 | 0.89 |
| | 14.69 | 15.65 | 0.96 |
| 6 days | 14.79 | 15.70 | 0.91 |
| | 14.79 | 15.62 | 0.83 |
| | 14.79 | 15.63 | 0.84 |
| | 14.79 | 15.60 | 0.81 |
| | 14.79 | 15.61 | 0.82 |

TABLE I-continued

| | Cracking Pressure with Vacuum Between O-Rings | | |
|---|---|---|---|
| | Atm (psi) | Opened (psi) | P (psi) |
| 15 days | 14.64 | 15.58 | 0.94 |
| | 14.64 | 15.54 | 0.90 |

As shown in Table I above, the pressure necessary to open the valve was determined after allowing the valve to sit under vacuum for different intervals of time. This was done to determine whether allowing the valve to remain closed for extended periods of time would affect the pressure necessary to open the valve.

As can be seen from Table I, if the valve is allowed to sit for a day or more there will be an additional 5 to 10% increase in the pressure differential required to open the valve. This increase does not appear to be any worse after two weeks than it is after one day.

The relief valve always open at a pressure differential under 1 psi, well below the 3 psi pressure, at which the vacuum vessel will be endangered.

The pressure differential necessary to lift the top plate, with vacuum between the o-rings and the annular plate, has been determined empirically. In the event that the seal between the annular plate 12 and solid plate 13 should stick, it will be readily apparent to those skilled in the art, that the pressure differential necessary to open the valve will be increased by the pressure necessary to lift the weight of the annular plate 12.

The disclosed relief valve thus provides a relief device which will relieve a vacuum vessel at a first predetermined pressure. Additionally, the relief valve of the present invention will open at a second predetermined pressure, should the valve stick at the first pressure.

The foregoing description of a preferred embodiment of the invention has been presented for purposes of illustration and description. It is not intended to be exhaustive or to limit the invention to the precise form disclosed, and obviously many modifications and variations are possible in light of the above teaching. The embodiment was choosen and described in order to best explain the principles of the invention and its practical application to thereby enable others skilled in the art to best utilize the invention in various embodiment and with various modification as are suited to the particular use contemplated. It is intended that the scope of the invention be defined by the claims appended hereto.

The embodiments of the invention in which an exclusive property or privilege is claimed are defined as follows:

1. A pressure relief device for use in a vessel, providing redundant pressure relief capabilities comprising:
   (a) a surface having an aperature to said vessel; and
   (b) an annular plate of predetermined weight having a bottom end and a top end, said annular plate having an inner diameter equal to the size of said aperature, the bottom end of said annular plate superposed over said aperature on said surface such that a seal is formed between said surface and said annular plate; and
   (c) a solid plate, of predetermined weight, superposed over the aperature on said annular plate such that a seal is formed between said solid plate and said annular plate,
   whereby said pressure relief device will open at a first predetermined pressure by lifting said solid plate and, with failure of said solid plate to lift at said first predetermined pressure, at a second, slightly higher, predetermined pressure by lifting both the solid plate and the annular plate.

2. The pressure relief device of claim 1 further comprising means for hinging said annular plate and said solid plate to said surface.

3. The pressure relief device of claim 2 wherein said surface comprises:
   a flange; and
   means for attaching said flange to said vessel.

4. The pressure relief device of claim 3 wherein the top of said flange and the top end of said annular plate each have at least one annular groove and wherein seals are positioned in the grooves of said flange and said annular plate.

5. The pressure relief device of claim 4 wherein said seals are o-rings.

6. The pressure relief device of claim 5 wherein the means for attaching the flange to the vessel comprise:
   a pipe segment having a top end and a bottom end the top end integrally connected to the bottom of said flange; and
   means for connecting the bottom of said pipe segment to said vessel.

7. The pressure relief device of claim 6 wherein the inner diameter of said annular plate is equal to the inner diameter of said pipe segment.

8. The pressure relief device of claim 7 wherein said hinging means comprises:
   a pivot pin mounted to said flange, said pivot pin mounted parallel to the plane of said flange;
   a first arm attached at one end to said solid plate and at the other end to said pivot pin;
   a second arm connected at one end to said annular plate and at the other end to said pivot pin.

9. The arrangement of claim 8 wherein said flange is made of stainless steel and said annular plate and said solid plate are made of aluminum.

10. A pressure relief device for use in a vessel, said pressure relief device providing redundant pressure relief capabilities comprises:
   (a) a pipe segment;
   (b) means for connecting the bottom of said pipe segments to said vessel;
   (c) a flange, the bottom end of said flange integrally connected to the top end of said pipe segments and the top of said flange having at least one annular groove;
   (d) an annular plate fo predetermined weight, the top of said annular plate having at least one annular groove and said annular plate having an inner diameter equal to the inner diameter of said pipe, segments;
   (e) o-rings, said o-rings being positioned in said annular grooves of each of said flange and said annular plate;
   (f) a solid plate of predetermined weight, said solid plate superposed over the aperature of said annular plate such that a seal is formed between said solid plate and said annular plate and said annular plate superposed over said flange such that a seal is formed between said annular plate and said flange; and
   (g) means for hinging said annular plate and said solid plate to said flange,
   whereby said pressure relief device will open at a first predetermined pressure by lifting said solid plate and with failure of said solid plate to lift at said first predetermined pressure, at a second, slightly higher, predetermined pressure by lifting both the solid plate and the annular plate.

11. The pressure relief device of claim 10 wherein said hinging means comprises:
 a pivot pin mounted to said flange, said pivot pin mounted parallel to the plane of said flange;
 a first arm attached at one end to said solid plate and at the other end to said pivot pin;
 a second arm connected at one end to said annular plate and at the other end to said pivot pin.

12. The arrangement of claim 11 wherein said flange is made of stainless steel and said annular plate and said solid plate are made of aluminum.

13. A pressure relief device for use in a vessel, said pressure relief device providing redundant pressure relief capabilities comprising:
 (a) a pipe segment;
 (b) means for connecting the bottom of said pipe segment to said vessel;
 (c) a flange, the bottom of said flange intergrally connected to the top of said pipe segment;
 (d) an annaular plate of predetermined weight, said annular plate having an inner diameter equal to the inner diameter of said pipe segment and said annular plate superposed over said flange such that a seal is formed between said flange and said annular plate;
 (e) a solid plate of predetermined weight, said solid plate superposed over said annular plate such that a seal is formed between said solid plate and said annular plate, whereby said pressure relief device will open at a first predetermined pressure by lifting said solid plate and, with failure of said solid plate to lift at said first predetermined pressure, at a second, slightly hgiher, predetermined pressure by lifting both the solid plate and the annular plate.

14. The pressure relief device of claim 13 further comprising means for hinging said annular plate and said solid plate to said surface.

15. The pressure relief device of claim 14 wherein the top of said flange and the top end of said annular plate each have at least one annular groove and wherein seals are positioned in the grooves of said flange and said annular plate.

16. The pressure relief device of claim 15 wherein said seals are o-rings.

17. The pressure relief device of claim 16 wherein said hinging means comprises:
 a pivot pin mounted to said flange, said pivot pin mounted parallel to the plane of said flange;
 a first arm attached at one end to said solid plate and at the other end to said pivot pin;
 a second arm connected at one end to said annular plate and at the other end to said pivot pin.

18. The arrangement of claim 17 wherein said flange is made of stainless steel and said annular plate and said solid plate are made of aluminum.

* * * * *